United States Patent [19]

Hamaguchi et al.

[11] Patent Number: 4,683,151

[45] Date of Patent: Jul. 28, 1987

[54] METHOD FOR APPLICATION OF REFRACTORY SPRAY MATERIAL

[75] Inventors: Setsunori Hamaguchi; Sumio Hanaoka, both of Kitakyushu, Japan

[73] Assignee: Kurosaki Refractories Co., Ltd., Kitakyushu, Japan

[21] Appl. No.: 789,795

[22] Filed: Oct. 21, 1985

[30] Foreign Application Priority Data

Oct. 31, 1984 [JP] Japan .................. 59-230938

[51] Int. Cl.$^4$ .................................... B05D 1/02
[52] U.S. Cl. .................. 427/397.8; 427/426; 427/427
[58] Field of Search .......... 427/397.8, 426, 427

[56] References Cited

U.S. PATENT DOCUMENTS

| | | | |
|---|---|---|---|
| 3,959,063 | 5/1976 | Hawthorne | 427/405 X |
| 4,317,851 | 3/1982 | Neser | 427/426 |
| 4,347,285 | 8/1982 | Batdorf | 427/397.8 |
| 4,461,789 | 7/1984 | Takashima | 427/427 X |
| 4,513,029 | 4/1985 | Sakai | 427/397.8 |

FOREIGN PATENT DOCUMENTS 123223  9/1979  Japan .................. 427/397.8

Primary Examiner—Shrive P. Beck
Attorney, Agent, or Firm—Jordan and Hamburg

[57] ABSTRACT

The application by spraying on a ceramic furnace wall of a refractory spray material prepared by mixing a spray powder consisting of 100 pts. wt. a refractory aggregate of a predetermined particle size and 0.1-3 pts. wt. a curing accelerator with 0.5-5 pts. wt. a damping agent added thereto is accomplished with notably high levels of adhesiveness and uniformity without deteriorating the working environment with dust by a method which comprises performing said application while admixing the refractory spray material with a sodium silicate solution as a binder having a viscosity in the range of 3-10 cPs at 15° C. and containing 2-8 wt. % $Na_2O$ and 8-20 wt. % $SiO_2$.

1 Claim, 4 Drawing Figures

METHOD FOR APPLICATION OF REFRACTORY SPRAY MATERIAL

BACKGROUND OF THE INVENTION

1. Field of the Invention

This invention relates to a method for the application of a refractory spray material to various ceramic furnace walls.

2. Description of the Prior Art

In recent years, the spraying method for application of a refractory material is following the direction of finding growing utility owing to the advantages (1) that the operation is simple because the spraying work can be performed without the need to use a frame for application, (2) that the massive application of a spray material can be attained within a short period of time, (3) that the apparatus can be assembled and repaired with great ease, and (4) that the spraying can be perfomed hot or cold at needs, coupled with the improvements achieved in spraying machines and nozzles.

This spraying method, meanwhile, suffers from the disadvantages (1) that the rebound loss generally runs on the order of 20% and often rises past 30% under certain conditions, so that a material loss is far greater than that involved in the casting method, (2) that the spraying entails the formation of dust in the environment of work, (3) that the adhesiveness of the applied material is not enhanced unless a larger amount of a binder is used than that in the casting method, and (4) that the refractoriness of the refractory material applied by the spraying method is liable to become lower than that of the material applied by the casting method, when aggregate of the same grade is used.

As a solution of these disadvantages, a method is now in vogue which comprises adding powdery sodium silicate as a binder to the spray material and admixing the spray material with water just before the spray material reaches the spray nozzle.

Even after the powdery sodium silicate is mixed with water, it does not exhibit its effect as a binder unless it is completely dissolved in water. However, the mixture ejected through the spray nozzle reaches the substrate in one second or shorter, so that the complete dissolution of sodium silicate in the accompanying water can never be expected during the short span of time.

The major part of the powdery sodium silicate, after having reached the substrate, gradually dissolves and begins to exhibit its effect as a binder. The powdery sodium silicate is consequently consumed in a manner such that its effect is not sufficiently exhibited. To overcome the difficulty, there has been generally practised a method which comprises premixing an excess amount of powdery sodium silicate in the spray material to make up for the insufficient result aforementioned.

The incorporation of the powdery sodium silicate in such an excess amount as aforementioned results in serious deterioration of the refractoriness of the spray material. As a result, even when the spray material mixed with the powdery sodium silicate as a binder may be used, it is difficult to enhance a ratio of adhesion above 85%.

For the improvement of these conventional methods, spraying methods using various binder solutions have been proposed in the specification of Japanese Patent Application Laid-open No. 55-000816, the specification of Japanese Patent Application Laid-open No. 55-015948, etc. Even in these proposed methods, since no sufficient affinity is obtained between the spray material and the binder solutions, it is difficult to obtain a ratio of adhesion exceeding 85% at all times. Some of the binders proposed so far are of such a nature that the preparation of their aqueous solutions itself induces the hydrolysis of the binders, so that the aqueous solutions prepared in this way have the inherent effects of binders reduced or completely lost.

As the means of completely damping the spray powder itself, the use of an amorphous refractory material in the form of slurry containing a curing agent has been proposed in the specification of Japanese Patent Publication No. 57-007350. In order to smoothly pneumatically convey the amorphous refractory material in the slurry form, the refractory material shall have proper softness. As a result, this material applied onto a predetermined substrate is liable to involve the phenomenon of weeping. Besides, the amount of a curing accelerator to be mixed in the spray material inside the nozzle is very small in general, so that the accelerator is not sufficiently dispersed in the spray material. The method, therefore, has the disadvantage that it is difficult to obtain a uniformly spray-coated body. Besides, the pretreatment for forming the amorphous refractory material (castable) containing a curing agent into the slurry inevitably imposes a limit upon the length of time during which the material is effectively usable. Consequently, the method has the disadvantage that the use of this material induces the phenomenon of clogging in the hose for pneumatic conveyance.

SUMMARY OF THE INVENTION

An object of this invention is to eliminate the various disadvantages which have been brought out in the conventional spraying methods and to improve the properties of the spray material, e.g. the ratio of adhesion, the strength of adhesion, and the refractoriness.

The characteristic features of the present invention will become more apparent from the description given in further detail herein below with reference to the accompanying drawings.

DETAILED DESCRIPTION OF THE INVENTION

The first characteristic of the present invention resides in predamping a spray powder containing a curing accelerator with water or a non-aqueous solvent, supplying the predamped spray powder from a tank to a nozzle, and spraying the predamped spray powder through the nozzle while admixing the predamped powder with a sodium silicate solution having a predetermined composition at a position in front of the orifice of the nozzle.

The second characteristic of the present invention resides in admixing the refractory spray material with a fine-grained material in which a part having a particle size of $10\mu$ or less exceeds 80 wt.%.

The present invention is further characterized by performing the spraying work while admixing the aforementioned sodium silicate having a specified composition as a binder with water at a position in front of the nozzle, whereas the spraying work is performed in the conventional spraying method while admixing the refractory spray material with water or a binder solution at a position in front of the nozzle section.

Figure 1:
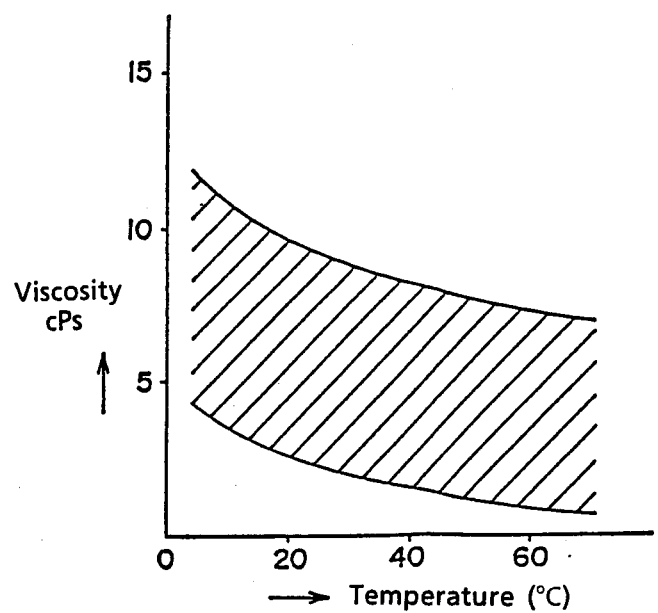
FIG. 1 is a graph showing the range of viscosity of sodium silicate solution to be used as a binder in the present invention.

The sodium silicate solution to be used in the present invention has viscosity in the range of 3–10 cPs at 15° C. as indicated by the hatched zone in the graph of FIG. 1, and a composition containing 2–8 wt. % $Na_2O$ and 8–20 wt. % $SiO_2$.

The refractory spray material mixedly predamped with 0.5–5 wt. % a solvent is further mixed with a binder solution at an injection part in front of the nozzle.

If the sodium silicate solution has higher viscosity exceeding the upper limit of the range aforementioned under these conditions, the affinity of the material would become poor. On the other hand, if the viscosity decreases below the range aforementioned, the adhesiveness and stickiness of the sodium silicate solution as a binder would become too smaller.

As regards each component in this composition, the amount of $Na_2O$ has a direct influence on the refractoriness of the refractory spray material. That is, the refractoriness becomes poor in response to the increase of $Na_2O$ in amount. The amount of $SiO_2$ or the total amount of $Na_2O$ and $SiO_2$ has direct relationship to the viscosity of the sodium silicate solution as a binder.

The specific numerical values indicated above have been experimentally confirmed as the requirements for obtaining the highest ratio of adhesion and adhesiveness without injuring refractoriness.

The optimum amount of the aforementioned sodium silicate solution as a binder to be incorporated is in the range of 7–18 wt. % in relation with the premixed refractory spray material.

Figure 2:
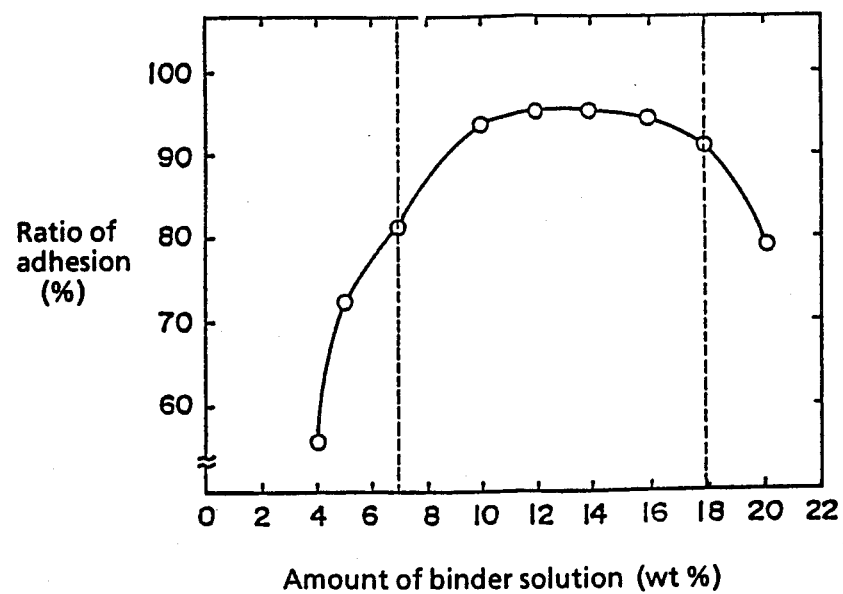
FIGS. 2-4 are graphs showing the effects exhibited upon the properties of the spray material in response to the change of the amount of the sodium silicate solution added as a binder.
Figure 3:
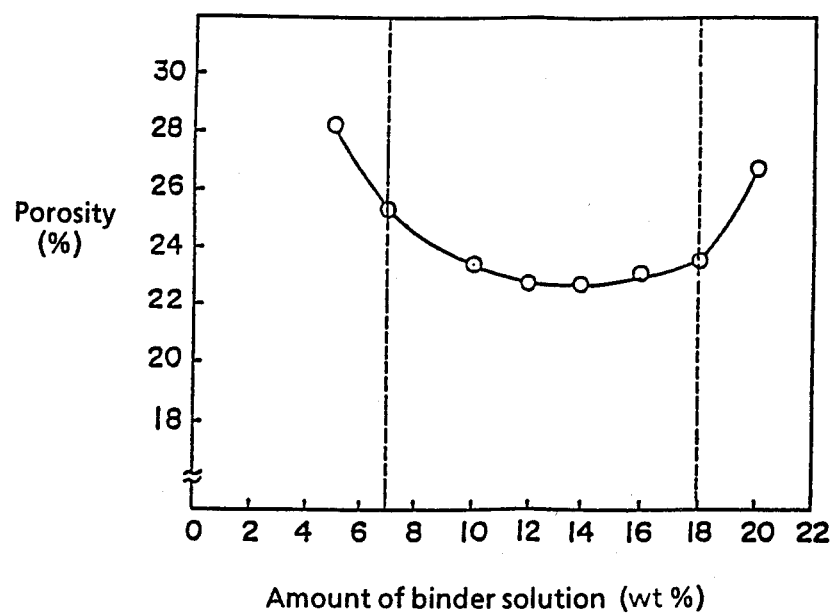
Figure 4:
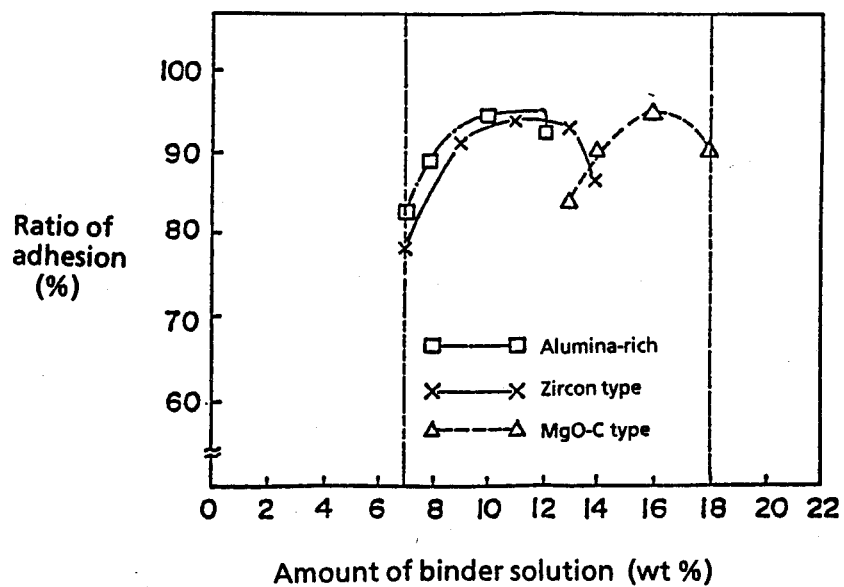

FIGS. 2–4 graphically show the effects exhibited on the properties of the spray material in response to the amount of the aforementioned sodium silicate solution incorporated as a binder.

FIG. 2 graphically shows the relation between the amount of the binder and the ratio of adhesion. It is apparent from this graph that the ratio of adhesion is seriously deteriorated in case of the amount below 7 wt. % because of the shortage of the binder and that the sprayed material undergoes the phenomenon of weeping in case of the amount above 18 wt. % while seriously injuring the spraying work because of the excessive supply of the binder.

FIG. 3 graphically shows the effect exhibited upon the porosity of the spray-coated body in response to the amount of the binder incorporated. It is apparent from this graph that the porosity becomes larger whether the amount of the binder is smaller below 7 wt. % or larger above 18 wt. %. This larger porosity is undesirable to obtain a spray-coated body having good physical property.

Of course, the proper amount of this binder to be incorporated is variable in relation with the kind and quality of the refractory aggregate being used. FIG. 4 graphically shows the influence of the refractory aggregate the optimum amount of addition of the binder.

Among the well-known curing agents for sodium silicate, e.g. inorganic acids, organic acids, compounds of such polyvalent metals as Ca, Mg, Al, Ba, and Zr, alkali metal carbonates, alkali metal phosphates, fluorides, and cement, the curing accelerators to be incorporated in the refractory spray material of this invention may be aluminum phosphate, oxalic acid, citric acid, tartaric acid, malic acid, p-toluenesulfonic acid, quick lime, slaked lime, magnesium oxide, aluminum chloride, calcium chloride, calcium sulfate monosodium hydrogencarbonate, sodium hexamethaphosphate, sodium silicofluoride, ammonium fluoride, and calcium aluminate as concrete examples.

Water is used as a damping agent for predamping the spray powder mixed with the aforementioned curing accelerator. When the curing accelerator to be incorporated is a magnetia- or dolomite-type aggregate, quick lime, or calcium aluminate, which has the possibility of reacting with water during storage, one or more compounds selected from polyhydric alcohols such as monoethylene glycol, oils and fats are used as a damping agent.

Further, in order to obtain a spray material excellent in refractoriness, adhesive strength, and ratio of adhesion, the raw material to be used therefor is expected to have a very fine particle size. Type-montmorillonite clay is particularly effective in this respect. However, it might be said that the clay of this kind does not have enough refractoriness. In this consequence, the use of $Al_2O_3$, $SiO_2$, SiC, C, zircon, zirconia, chromium oxide, MgO, CaO, etc. having the particle distribution that a part of $10\mu$ in particle size exceeds 80 wt. % is desirably used in stead of the whole or part of the aforementioned clay to improve the properties.

The spraying method of this invention is intended for application to various furnaces, e.g. converter, electric, DH and RH furnaces, tundish, ladle, blast furnace, trough, torpedo, hot stove, coke oven, soaking oven, heating oven, furnace for melting or treating non-ferrous metals, heat-treating furnace, smokestack, flue, boiler and incinerator.

EXAMPLE

Now, the effect of the present invention will be specifically described below with reference to working examples.

TABLE

| Composition and properties | | Comparative Experiment | Example 1 | Example 2 | Example 3 |
| --- | --- | --- | --- | --- | --- |
| Composition (parts by weight) | | | | | |
| Refractory material | Alumina-rich aggregate (of 4 mm or less in particle size) | 100 | 100 | 100 | |
| | MgO aggregate (of 4 mm or less in particle size) | | | | 100 |
| | Fine alumina particles (of $10\mu$ or less in particle size) | | | 8 | |

TABLE-continued

| Composition and properties | | Comparative Experiment | Example 1 | Example 2 | Example 3 |
|---|---|---|---|---|---|
| | Slaked lime | 0.5 | 0.5 | 0.5 | 0.5 |
| | Powdery sodium silicate | 4 | | | |
| Damping agent | Water | | 1.5 | 1.5 | |
| | Monoethylene glycol | | | | 2.0 |
| Additive agent (at position of nozzle) | Water | 14 | | | |
| | Sodium silicate solution | | 11 | 11 | 11 |
| Properties | | | | | |
| Workability of spraying | Ratio of adhesion (%)*1 | 80 | 92 | 97 | 93 |
| | Generation of dust | Heavy | Very little | Very little | Very little |
| | Lamination | Yes | No | No | No |
| | Curing time (min).*2 | 30 | 1 | 1 | 1 |
| Spraying property | Apparent porosity (%) | 35.2 | 29.5 | 26.5 | 27.0 |
| | Bending strength (kg/cm$^2$) | 2 | 30 | 50 | 35 |
| | Adhesive strength (kg/cm$^2$) | 0.5 | 5 | 9 | 7 |

*1Ratio of adhesion measured during spraying on vertical wall.
*2Interval between the time the spray was finished and the time the curing was completed.

EXAMPLE 1

A refractory spray material prepared in advance by compounding 100 pts. wt. a alumina-rich aggregate, 0.5 pts. wt. slaked lime as a curing accelerator and 1.5 pts. wt. water as a damping agent in a tank was sprayed, while adding 11 pts. wt. a sodium silicate solution to the spray material at the metal fitting of a nozzle. The ratio of adhesion of the spray material was remarkably enhanced, as compared with the material applied in a comparative experiment (not conforming with this invention). In addition, the spraying work was performed in a very shot curing time (e.g. 1 min), without the formation of dust or the lamination of the spray-coated body as a product.

These favorable results may be ascribable to notably quick and efficient reaction of the spray material with the curing accelerator as compared with the reaction thereof with the powdery sodium silicate. The sprayed material also exhibited remarkably high physical properties.

EXAMPLE 2

Spraying was performed out, following the procedure of Example 1, except that the spray material used herein was prepared by incorporating 8 wt. % calcined alumina having the particle distribution that a part of 10μ or less in particle size was 90 wt. % or more. The ratio of adhesion was further enhanced up to 97%, and the physical property of the product was also improved.

EXAMPLE 3

Spraying was performed, following the procedure of Example 1, except that a magnesia aggregate was used as a basic component instead of the alumina-rich aggregate while using monoethylene glycol as a damping agent. The ratio of adhesion was excellent (93%) in this case, too, and a spray-coated product was obtained without the formation of dust or lamination.

According to the spraying method of this invention, a uniformly spray-coated body is obtained with a high ratio of adhesion in a clarified working environment without the formation of dust. The physical property of the spray-coated body obtained in this way in remarkably improved.

In the conventional spraying method, the thickness of an applied layer is up to about 100mm at most. The thickness of the applied layer is now easily enlarged (e.g. 300 mm or more) by the method of this invention. This improvement is derived from the very high curing speed and excellent adhesive property of the spray material of this invention.

The excellent explosive resistance of the spray-coated body during drying is one of the major effects of the present invention. This is caused by the property of the specified liquid sodium silicate to be used in this invention. That is, the sodium silicate, different from cement bond, causes intensive gelling reaction, so that the abrupt increase of vapor pressure does not come out even in case of the rapid rising of a temperature.

What is claimed is:

1. A method for the application of a refractory spray material prepared by mixing a spray powder comprising 100 parts by weight of a refractory aggregate of an adjusted grain size and 0.1-3 parts by weight of a curing accelerator with 0.5-5 parts by weight of a wetting agent added thereto, which method is characterized by performing said application spraying with a nozzle while admixing said mixture with a sodium silicate solution as a binder having a viscosity in the range of 3-10 cPs at 15 degrees centigrade and containing 2-8% by weight of Na$_2$O and 8-20% by weight of SiO$_2$ at a position in front of an orifice of the nozzle.

* * * * *